United States Patent [19]
Stoll et al.

[11] 4,212,320
[45] Jul. 15, 1980

[54] MULTIWAY VALVE

[75] Inventors: Kurt Stoll, Esslingen, Fed. Rep. of Germany; Jan R. deFries, Zürich, Switzerland

[73] Assignee: Festo-Maschinenfabrik Gottlieb Stoll, Esslingen, Fed. Rep. of Germany

[21] Appl. No.: 945,498

[22] Filed: Sep. 25, 1978

[30] Foreign Application Priority Data

Sep. 29, 1977 [DE] Fed. Rep. of Germany ....... 2743829

[51] Int. Cl.² ................... F15B 13/042; F16K 11/04
[52] U.S. Cl. ............................ 137/625.6; 137/625.66; 251/61.5
[58] Field of Search .................. 137/625.6, 625.66; 251/61.5

[56] References Cited

U.S. PATENT DOCUMENTS

| | | | |
|---|---|---|---|
| 2,913,005 | 11/1959 | Grant et al. | 137/625.6 |
| 4,046,159 | 9/1977 | Pegourie | 137/625.66 X |
| 4,066,101 | 1/1978 | deFries | 137/625.6 |
| 4,078,580 | 3/1978 | Rüdle | 137/625.6 |

FOREIGN PATENT DOCUMENTS

| | | | |
|---|---|---|---|
| 2227778 | 12/1973 | Fed. Rep. of Germany | 137/625.6 |
| 2447425 | 4/1976 | Fed. Rep. of Germany | 137/625.6 |
| 2520326 | 11/1976 | Fed. Rep. of Germany | 137/625.66 |

*Primary Examiner*—Gerald A. Michalsky
*Attorney, Agent, or Firm*—Blanchard, Flynn, Thiel, Boutell & Tanis

[57] ABSTRACT

A multiway valve having a housing with an axially movable main valve body reciprocally mounted therein between first and second positions. The main valve body is received in a main valve chamber and a control valve chamber. A flexible and axially movable diaphragm is connected to and extends between the housing and the main valve body to block the communication between the main valve chamber and the control valve chamber. The housing has a working port and a main vent bore therein communicating with each other past a valve seating structure on the housing and the main housing valve body which controls communication therebetween in response to movements of the main valve body between the first and second positions. One side of the diaphragm is in communication with the main vent bore at all times. A passageway is provided in the housing and a valve is disposed in the passageway for controlling the supply of pressurized fluid to the control valve chamber. An annular spring having radially inwardly extending resilient arms thereon is mounted in said control valve chamber adjacent the diaphragm. An annular member is disposed between the annular spring and the diaphragm with the resilient arms engaging the annular member to urge same toward the diaphragm.

10 Claims, 2 Drawing Figures

MULTIWAY VALVE

FIELD OF THE INVENTION

This invention relates to a multiway valve.

BACKGROUND OF THE INVENTION

A known multiway valve comprises a main valve chamber in which a main valve body, controllable by a pressure medium, is axially displaceable and into which open at least one pressure line and one operating bore which may be isolated with the aid of the main valve body; a control valve chamber which is an axial extension of the main valve chamber and is separated from the latter by an axially adjustable diaphragm, the latter, on one side being firmly clamped to the valve casing, and being connected, on the other side, with the main valve body; a movable control valve body which, in one of its end positions provides a connection between a line connected with the pressure supply line and the control chamber and, in its other end position, provides a connection between the control valve chamber and a venting duct for the control system; the diaphragm and possibly also a respective end of the main valve body, comprising an area to which pressure may be admitted from the control valve chamber, which is larger than the area at the other end of the valve body where pressure may be admitted in the opposite direction.

Since the radial vent bore of the multi-way valve is located opposite to the connecting line and is connected with the diaphragm surface which is remote from the control valve chamber, it is possible that breakdown occurs if, at the moment of reversal, the full pressure P is also admitted to the venting passage. This temporary state may, for example, occur during the opening of the main valve chamber. Since at this moment also the auxiliary valve chamber is under the pressure P it follows that the diaphragm is loaded from both sides with the same pressure which in this case acts against approximately equal areas on the two diaphragm surfaces. If this is the case, an unstable state is created, that is to say, the diaphragm is locked at the beginning of, or during the process of reversal or—in the least favourable case—even anywhere between the end positions, preventing the valve from moving into its other end position. However, even in the absence of the least favourable condition, the locking of a diaphragm always entails considerable delays of switching. These are undesirable not only because of the delays as such which cause the time of valve reversal or the closing of the main valve body to be unduly long, but also because the reversal or closing speed which ought to be constant, varies depending on purely accidental conditions.

According to the present invention there is provided a multiway valve comprising a casing defining a main valve chamber, in which a main valve body, arranged to be controlled by a pressure medium, is axially displaceable and into which open at least one pressure bore and one operating bore the bores being selectively isolated from the main valve chamber by means of the main valve body, a control valve chamber arranged as an axial extension of the main valve chamber and isolated from the latter by means of an axially movable diaphragm which is clamped between the valve casing and the main valve body, a controllable control valve body which, in one end position, connects a connecting line, the latter communicating with the pressure bore, with the control valve chamber, and in its other end position provides a connection between a control vent bore and the control valve chamber, the area of the diaphragm, and where applicable of the respective end of the main valve body to which pressure is admitted being greater than the area to which pressure may be admitted at the other end of the main valve body, and means being provided to pre-tension the diaphragm in the closing direction of the main valve body.

Preferably the pre-tensioning means comprises a spring which is accommodated in the control valve chamber.

This pre-tension prevents the diaphragm or the main valve body respectively from being locked at accidental positions when equal pressures are admitted to either side of the diaphragm, because the spring is capable in any position of forcing the main valve body to assume its closing position. Moreover, the spring aids the movements of closing even under normal operating conditions, which means that the time of reversal may be maintained constant.

In a preferred embodiment of the invention the spring element is made of spring steel and has the form of a disc with a rosette shaped cut-out. The edge of this disc shaped spring is firmly clamped so that the inward extending arms provide the main valve body with the required pre-tension.

In another embodiment of the present invention an annular member, preferably consisting of a plastics material is provided between the spring element and the side of the diaphragm which projects into the control valve chamber. Since this annular member occupies a major part of the control valve chamber, the free space which is used up by the movement of closing is reduced, and the speed of reversal is correspondingly increased. The relative movements of the resilient arms of the spring element are absorbed by the annular member which, in consequence of its shape, not only ensures that it occupies a central position but also prevents the diaphragm from bulging upwards and possibly snapping out of the clamping elements.

BRIEF DESCRIPTION OF THE DRAWINGS

An embodiment of the invention will now be described by way of example only with reference to the accompanying drawings, in which.

DETAILED DESCRIPTION

Figure 1:
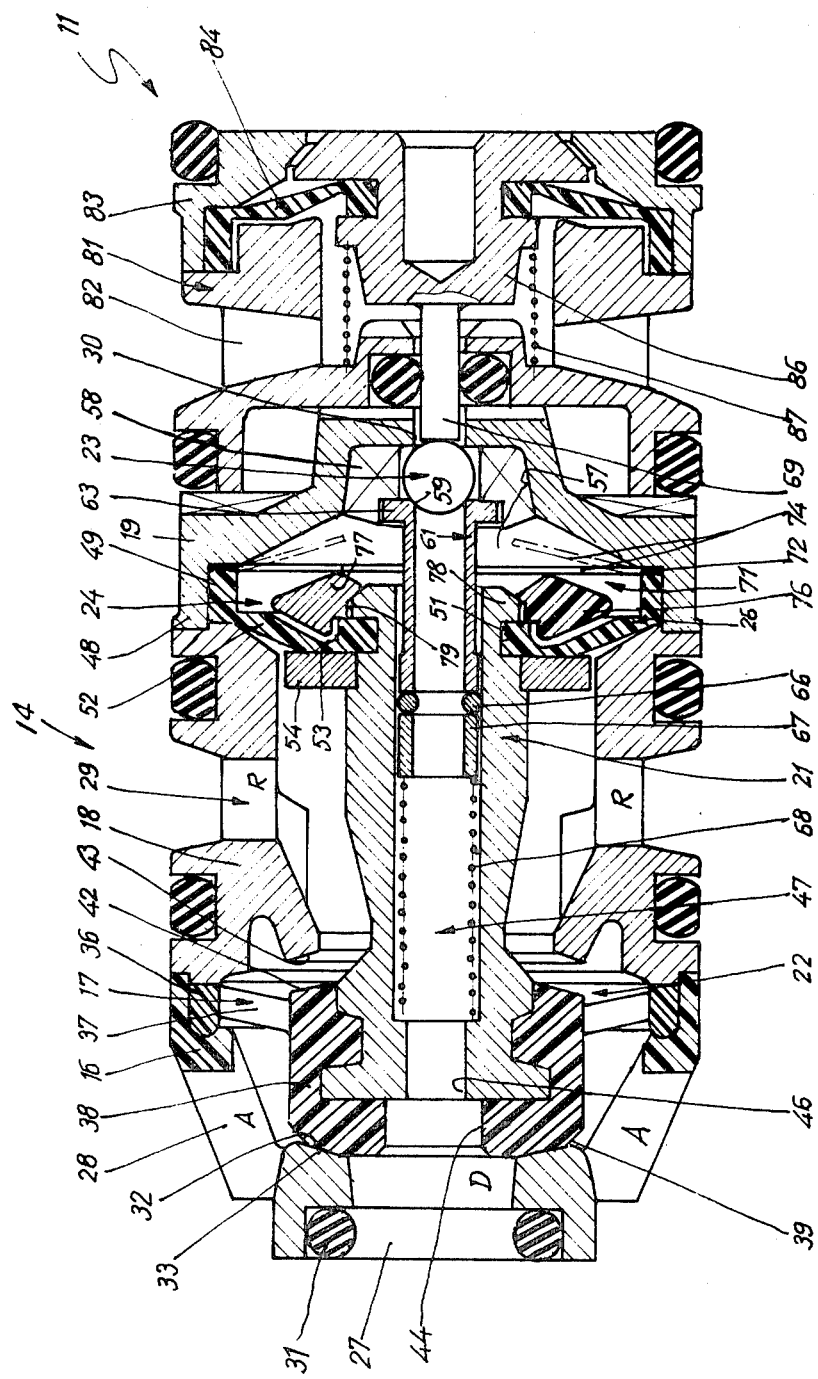
FIG. 1 is a longitudinal section through the insert in a multiway valve according to a chosen embodiment of the present invention.

A multiway valve 11 according to the invention is furnished with a housing which is not shown in the drawing and comprises a cavity in the form of a substantially cylindrical, smooth, bore into which the valve insert 14 is pushed and where it is firmly held in position, the cartridge shaped valve insert being designed in such a manner that it fits into the axial bore in the valve housing without substantial play.

Viewed in the direction from internally to externally, that is to say from the pressure duct to the operating end, the valve insert 14 comprises a first ring 16, a spoke-wheel shaped element 17, a second ring 18 and a profiled cover 19. Inside the insert, and co-axial with these elements are located, a main valve body 21 in a main valve chamber 22, a control valve body 23 in a control valve chamber 24, and a diaphragm 26 which separates the main valve chamber 22 from the control valve chamber 24 in a pressure tight manner. In addition to this the valve insert 14 comprises an axial pressure bore 27 which communicates with concentric working passages 28, radial main vent bores 29 and an axial control vent bore 30 all bores or passages being connected with corresponding pressure-, operating-, or vent-bores in the not illustrated valve casing and with lines connectable therewith. These lines are connected with a pressure medium source, or pneumatic or hydraulic operating units or the atmosphere respectively.

The axial pressure bore 27 is axially arranged at the inner end of the first ring 16 and opens into the main valve chamber 22, part of which is located inside the ring 16. The end section of the ring 16 which interacts with the pressure bore in the valve casing is provided with a step with an O-ring 31 and an end face which is remote from the O-ring and faces the main control chamber 22, is provided with a first annular seating area 32 which concentrically surrounds the pressure bore 27 and conically extends externally, against which the sealing area 33 of the main valve body 21 may be pressed in a pressure tight manner. A preferably conical annular surface, facing the valve casing and concentrically surrounding the pressure bore 27, is provided with a number of bores which are equidistantly arranged and constitute the operating passage 28, opening like the above, into the main valve chamber 22.

A rim 36 of the spoke-wheel shaped part 17, which is integrally formed of a suitable resilient plastics material, is wedged between the two rings 16 and 18 which firmly hold it in position.

From the rim 36 are projecting radial spokes 37 which are integral with a hub 38, constituting an envelope for a front end 39 of the main valve body 21, and incorporating the sealing surface 33. The front end 39 of the main valve body 21, and the envelope 38, are connected with each other in substantially positive surface contact, the envelope 38 embracing the front face of the main valve body 21, and an annular extension on it engaging, in a region at the rear, with an annular groove in the main valve body 21. In addition to this the envelope 38 comprises, at the end which is remote from the face with the conical sealing surface, 33 which overlaps the main valve body 21, a rearward sealing surface 42 which interacts with a second seat 43 located on an inward extending part of the second ring 18. The envelope 38, which is located inside the main valve chamber 22 also comprises an axial bore 44 whose diameter is smaller than the diameter of the pressure bore 27 but exceeds the diameter of a continuous bore 46 in the main valve body 21 which constitutes part of a connection 47 between the pressure bore 27 or the bore in the valve casing and the control valve chamber 24. In consequence of these differences between the diameters, annular front faces are formed on the envelope 38 or the main valve body 21 respectively, which are exposed to the pressure medium admitted through the pressure duct 27.

The second ring 18 is provided with radial bores in its middle zone, which constitute the main vent passages 29 and, depending on the instantaneous positions of the main valve body 21, may be connected with, or isolated from, the main valve chamber 22.

The diaphragm 26 is inserted between the second ring 18 and a rim 48 projecting from the cover 19 which substantially defines the control valve chamber 24. An outer ring 49 of the diaphragm 26 rests against the rim 48 of the cover, surrounding the main valve body 21, and is thereby sunk into an annular groove 51 where it is held in positive surface contact. Adjacent to its outer ring 49 the diaphragm 26, manufactured from a suitable, resilient, plastics material which enables the main valve body 21 to be floatingly suspended, is provided with a thinner annular zone 52, and in the vicinity of the main valve body 21, with an annular notch 53 which opens externally, so that the diaphragm 26 is very flexible. In the region of this annular groove 53 the inner side of the diaphragm 26 rests against a ring 54 which is in positive contact with the main valve body 21. The cover 19 connected with the control vent bore 30 through an axial bore is located in the rear region of the second ring 18.

Figure 2:
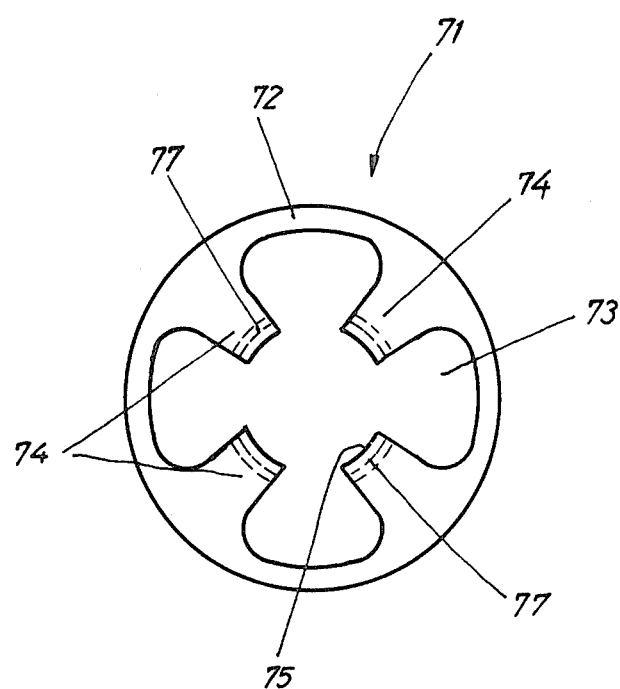
FIG. 2 shows a spring element loading the diaphragm.

Inside the control valve chamber 22 is located a spring element 71, its rim 72 being fixed between the outer ring 49 of the diaphragm 26 and the cover 19. The spring element 71 which is made of spring steel, is disc shaped with a rosette like cut out 73 (FIG. 2) this design being such that four radially inwards projecting resilient arms 74 are formed which, in pairs, are opposite each other, their free ends being located on the boundary line of an imaginary bore 75 whose diameter slightly exceeds the diameter of a collar 78 on the main valve body 21, which projects into the control valve chamber 23. An annular element 76 made of a plastics material is located between the spring element 71 and the diaphragm 26. The plan of this annular element 76, regarded in half section, is substantially triangular corresponding to the relative arrangement between the collar 78 on the control valve body and the inner ring of the diaphragm, the internal side 79 of the ring is step shaped. The form of these steps is thereby such that the annular element 76 is pressed against the collar 78 of the main valve body by the effect of the resilient arms 74 of the spring element 71, leaving a narrow gap between the surface areas which are adjacent to the diaphragm 26 and the diaphragm 26 itself. When the main valve body 21 assumes its closed position the spring element 71 extends substantially perpendicular to the valve axis as is shown in FIG. 1, and there may again be a slight pre-tension which is directed internally, i.e. towards the diaphragm. In any case, the annular element 76 is supported by the spring element 71 in such a manner that it cannot be displaced in a direction at right angles to the valve axis, but being held at the collar 78 of the main valve body 21, retains its centricity. The spring element 71 or rather its resilient arms 74 rest against the annular element 76 in a narrow, annular, zone 77 which is indicated in FIG. 2, by the faint concentric lines. It follows that the annular element 76 absorbs the deflection of the diaphragm 26, transmitting it to the spring element 71 whereby the resilient arms 74 are forced to assume the positions indicated in FIG. 1 by chain-dotted lines, while the main valve body 21 moves in the direction of opening. In this opening position, the resilient arms 74 which are considerably pre-tensioned in the direction towards the diaphragm, try to force the main valve body 21 to resume its closing position. The presence of the annular element 76 reduces the free space in the control valve chamber 24, which is consumed by the reversal, and the switching speed is therefore correspondingly increased. In addition to this the annular element 76 prevents the diaphragm 26 from bulging upwards with the consequential danger of the outer diaphragm ring 49 snapping out of the clamp provided between the diaphragm 26 and the cover 19; otherwise this would inevitable occur when the diaphragm bulges excessively.

The cover 19 comprises a conical axial recess 57 in the direction towards the control vent bore 30 into which radial ribs 58 are inserted, and fixed, controlling the spherical control valve body 23 which is located between the ribs. In a first position this valve body 23 may seal the control vent bore 30 as shown in the drawing, by resting against the bore, or it may be in contact with a seat 59 at the end of a small tube 61 which projects into the control valve chamber 24. The small tube 61, the axial bore of which is connected with the continuous bore 46 of the main valve body 21 and also constitutes part of the connecting line 47, projects into the continuous bore 46 of the main valve body 21. The end of the small tube 61 which extends beyond the main valve body 21 and projects into the conical valve chamber 24 is provided with a collar 63 butting against a stopping area formed by cut-outs in the ribs 58. As shown in the drawing the distance between the collar 63 of the small tube 61 and the front face of the main valve which is located opposite to the collar is, in the illustrated end position, as great as the lift including the allowed excess lift of the main valve body 21 when moving into its other end position. The inner end of the small tube 61 rests against a pre-tensioned compression spring 68 through an O-ring and an intermediate sleeve 67, said spring being supported against an annular surface in the continuous bore 46, and not only causes the small tube 61 to take up its other end position, butting against the stop (FIG. 1) before reversal takes place (that is to say that the seat 59 for the control valve body 23 is retained in a given position relative to the control valve body 23), but also causes the seat 59 for the control valve body 23 to be resilient enough to take up the excess lift when the valve moves into the other end position which is not shown in the drawing.

The axial distance between the seat 59 on the small tube 61 and the corresponding sealing area of the spherical control valve element 23 may be very small, for example in the range from 60 to 100 times 1/1000 mm, and the lift required for the reversal of the multiway valve 11 may therefore be extremely short.

The control valve body 23 is actuated with the aid of an operating pin 69 which extends through the control vent bore of the cover 19. This pin 69 is pressure tightly controlled in the axial direction in a guide-and supporting element 81 which is inserted into the same bore of the valve housing and is mounted on the cover 19, the radial passages 82 being open. The function of the part 81, of guiding the movements of the pin 69 is complemented by the function of supporting, together with the terminal flange 83 which it carries, an operating member 86 which is connected with the operating pin 69 in such a manner that it may reciprocate in both axial directions with the aid of a diaphragm 84. The operating member 86 being movably suspended from the diaphragm 84 thus constitutes a second, or preliminary, operating stage for the actual multiway valve 11. This operating member 86 may be driven pneumatically, mechanically, or in any other suitable manner. To make the operating member 86 resume its position according to FIG. 1, a compression spring 87 is provided which supports itself at the base of an axial blind bore in the holding element 81, into which moreover the member 86 extends. As mentioned above the holding element 81 and the flange 83 with the operating element 86 constitute, together with the valve 11, a cartridge shaped unit, the parts being arranged one behind the other in a pressure-tight assembly which is inserted into the casing bore. The multiway valve 11 operates as follows: In FIG. 1, the end position is shown of the main valve body 21 which is movable in both axial directions, the illustrated position being the end position in which the main valve body 21 butts against the inner ring 16, closing the connection between the pressure bore 27 and the working passage 28, so that the working passage 28 is connected with the main vent bore 29. In addition to this the connecting line 47 which is connected with the pressure bore 27, is also connected with the control valve chamber 24 so that, on one side, the pressure medium presses the spherical control valve member 23 against the control vent bore 30 which is thereby closed, while on the other side the control valve chamber 24 is under pressure. Since the annular surface of the diaphragm 26 which is adjacent to the control valve chamber 24, and is exposed to the pressure medium, is larger than the annular area on the main valve body 21 which is immediately adjacent to the pressure bore 27, the main valve body 21 is maintained in this first end position. When the pin 69 acting against the effect of the pressure medium in the connecting line 47 presses the spherical control body 23 internally in the axial direction, the spherical body 23 releases the control vent bore 30 because of the very short lift, and closes immediately thereafter the bore 62 of the small tube 61, isolating therewith the control valve chamber 24 from the pressure bore 27. The control valve chamber 24 is thereby vented through the bore 30 and the connection line 47 does not admit any substantial quantities of the pressure medium during this process. In consequence of this method of venting the control valve chamber 24, the pressure which is admitted to the diaphragm 26 decreases and the pressure medium is therefore capable of displacing the main valve body 21 in the axial direction, forcing it to assume its second end position as soon as the pressure on the annular area of the main valve body 21 facing the pressure bore 27 exceeds the pressure in the conrol valve chamber 24, which loads the diaphragm 26. When the control valve chamber 24 is completely vented, the lift of the main valve body 21 is completed, and the sealing surface 42 at the rear of the main valve body 21 will rest against the second seat on the ring 18. This lift motion of the main valve body is aided by the spoke shaped part 17, which having overcome the central position, snaps into its end position. The movements in the opposite direction create corresponding conditions. The process of reversal is extremely rapid also, since the venting of the control valve chamber may be effected without the admission of substantial quantities of the pressure medium.

In this second end position which is not shown in the drawing the pressure bore 27 is connected with the operating passage 28 through the main valve chamber 22 while the main vent bore 29 is pressure-tightly isolated by the main valve chamber 22. It is thus possible for one or several hydraulic or pneumatic operating units to be driven, which are not shown in the drawing.

When the operating pin 69 is released or rather when the latter resumes its initial position, the spherical valve body 23, loaded by the pressure medium releases the mouth of the bore in the small tube 61 or the mouth of the connecting line 47 opening into the control valve chamber 24, and closes the control vent bore 30. It follows that the spherical body 23 is caused to return automatically into its end position in which the ball closes the opening of the control vent passage 30. The opening of the connecting line 47 enables the pressure medium to flow again into the control valve chamber 24, which means that the main valve body 21 may be moved back into its first end position when the pressure on the diaphragm 26 exceeds the pressure on the annular surfaces of the main valve body which are located opposite the pressure bore 27. The reversal into the first end position is essentially equally quick, despite the restricting zone between the seat of the small tube 61 and the spherical valve body 23. The spring element 71 causes the main valve body 21 in any case to resume its closed position even in the event of pressure being present during the process of reversal both in the vent bore and in the control valve chamber. Since in this case the pressure is the same on either side of the diaphragm 26 and bearing in mind that also the corresponding pressure loaded surfaces are substantially identical, it is possible that in the absence of the spring element 71 the main valve body 21 might be locked in any position, or that at least the reversal time might be delayed.

Being pre-tensioned, the spring element 71 will act against the build-up of an unstable state of equilibrium at least when the main valve body is assuming its closing position, because the spring force acting against this danger of building up an unstable equilibrium, is great enough to eliminate this unstability in a clearly predefined direction.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A multiway valve, comprising:
   housing means forming a main valve chamber and a control valve chamber therein;
   an axially movable main valve body reciprocally mounted for movement between first and second positions in said main valve chamber and extending into said control valve chamber;
   first means defining a working port communicating with said main valve chamber;
   second means defining a main vent bore communicating with said main valve chamber, said main valve body and said housing means each having third means thereon cooperatively related to control the communication between said working port and said main vent bore in response to movements of said main valve body to said first and second positions;
   flexible and axially movable diaphragm means connected to and extending between said housing means and said main valve body and blocking the communication between said main valve chamber and said control valve chamber, one side of said diaphragm means being in communication with said main vent bore when said main valve body is in each of said first and second positions;
   passageway means defining an inlet port to said housing means for supplying pressurized fluid to said control valve chamber to urge said main valve body to said first position;
   valve means in said passageway means for controlling the supply of pressurized fluid to said control valve chamber, a blocking of said supply of said pressurized fluid to said control valve chamber effecting an axial shifting of said main valve body to said second position and an axial flexing movement of said diaphragm means to accommodate the shifting movement of said main valve body;
   annular spring means in said control valve chamber secured to said housing means and having plural radially inwardly extending resilient arms; and
   an annular member axially movably disposed in said control valve chamber between said diaphragm means and said resilient arms, said resilient arms engaging said annular member and urging same toward said diaphragm means.

2. The multiway valve according to claim 1, wherein four integral resilient arms are provided on said annular spring means which are equidistantly spaced around the integral circumference thereof.

3. A multiway valve according to claim 2, wherein said radial resilient arms are formed in such a manner that they define a rosette shaped free space within the spring element.

4. The multiway valve according to claim 1, wherein one side of said annular member is adjacent to said end of said main valve body projecting into said control valve chamber and said diaphragm means while the other side is engaged with said resilient spring arms over a narrow annular zone.

5. The multiway valve according to claim 1, wherein the width of said annular member substantially corresponds to the annular region of said diaphragm means which is capable of elastic deformation.

6. The multiway valve according to claim 1, wherein said annular member is formed of a plastics material.

7. The multiway valve according to claim 1, wherein said annular member occupies a major part of said control valve chamber.

8. The multiway valve according to claim 1, wherein the free ends of said resilient arms define a circular-shaped hole, the diameter of which is larger than the diameter of the end of said main valve body that projects into said control valve chamber.

9. The multiway valve according to claim 1 or 8, wherein said annular member rests on said main valve body under the action of said annular spring means and that a gap exists between said diaphragm means and said annular member.

10. The multiway valve according to claim 1, wherein said annular element has an approximately triangular-shaped cross section.

* * * * *